US006272009B1

(12) United States Patent
Buican et al.

(10) Patent No.: US 6,272,009 B1
(45) Date of Patent: Aug. 7, 2001

(54) APPARATUS FOR PIVOTALLY MOUNTING A SYSTEM COMPONENT IN A COMPUTER

(75) Inventors: Eugene Buican, Austin; Paul Higgins, Round Rock, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/425,076

(22) Filed: Oct. 21, 1999

(51) Int. Cl.[7] ....................................................... G06F 1/16
(52) U.S. Cl. ........................ 361/683; 361/727; 361/740; 312/223.5
(58) Field of Search ................................. 361/683, 825, 361/724, 725, 726, 727, 684, 685, 686, 687, 740, 759; 248/560, 551–553; 312/223.1–223.06; 220/4.02

(56) References Cited

U.S. PATENT DOCUMENTS

| 5,032,952 | 7/1991 | Cooke et al. | 361/747 |
|---|---|---|---|
| 5,172,305 | 12/1992 | DeWilde | 361/796 |
| 5,271,152 | 12/1993 | Murphy | 29/830 |
| 5,745,342 | 4/1998 | Jeffries et al. | 361/683 |
| 5,784,251 | 7/1998 | Miller et al. | 361/683 |
| 5,995,364 | * 11/1999 | McAnally et al. | 361/685 |
| 6,053,586 | * 4/2000 | Cook et al. | 312/223.2 |
| 6,118,668 | * 9/2000 | Scholder et al. | 361/753 |

* cited by examiner

Primary Examiner—Leo P. Picard
Assistant Examiner—Hung Van Duong
(74) Attorney, Agent, or Firm—Haynes and Boone, L.L.P.

(57) ABSTRACT

An apparatus for mounting a system component in a computer chassis. The chassis has a plurality of walls and an opening is formed in one of the walls. A pair of mounting flanges is connected in the chassis adjacent the opening. A first resilient cantilever beam is provided on each flange. A bracket is mounted in the opening and includes a pair of arms. The bracket is movable between open and closed positions. A second resilient cantilever beam is mounted on each arm and is engaged with each flange. A system component is mounted in the bracket.

22 Claims, 5 Drawing Sheets

APPARATUS FOR PIVOTALLY MOUNTING A SYSTEM COMPONENT IN A COMPUTER

BACKGROUND

The disclosures herein relate generally to computer systems and more particularly to an apparatus for pivotally mounting a power supply.

Desktop computers are becoming smaller without sacrificing performance or expandability. The components mounted within a chassis of a computer are packaged more closely together. Furthermore, to provide enhanced functionality of a computer system, more components are also being mounted within the chassis. As a result, the internal components become less accessible and servicing of the internal components becomes more cumbersome.

As the size of computers decreases, it becomes necessary to position the power supply in front of other components that require servicing. Positioning the power supply in this manner significantly limits access to other components adjacent to the power supply. One way to improve accessibility of the components behind the power supply is to movably mount the power supply to the chassis such that it can be moved to provide improved access to adjacent components.

U.S. Pat. No. 5,784,251 discloses, an appliance such as a personal computer that includes a metal chassis. The chassis includes a main chassis section and a sub-chassis hingedly connected to the main chassis section for rotation about a horizontal axis between folded-in and folded-out positions. The sub-chassis carries operational components such as a power supply and a drive, and the main chassis section carries an operational component such as a motherboard. When the sub-chassis is in its folded-in position it overlies the motherboard and blocks access thereto. When in its folded-out position, the sub-chassis provides access to the motherboard.

U.S. Pat. No. 5,745,342 discloses a multi-positionable power supply mounting hinge device that includes first and second chassis members. The second chassis member is movably connected to the first chassis member. A bracket is fixedly mounted on the first chassis member. A flexible hinge detent member is connected to the second chassis member and extends to movably engage the bracket. The hinge detent member includes a wavy surface of sequentially variable protrusions and depressions. The wavy surface is in continuous friction engagement with the bracket in response to the hinge member being deflected when the second chassis member is moved relative to the first chassis member.

U.S. Pat. No. 5,032,952 discloses a pivotable power supply for a computer that rotates away from the computer circuit board so that servicing of system components located behind the power supply is facilitated. The power supply is provided with a ground strap which remains attached during power supply pivoting thus assuring that the power supply will be grounded after system servicing. Also, a threaded, spring-loaded fastener for locking the power supply in position is designed such that the covers cannot be replaced on the housing unless the power supply is connected to the system circuit board.

The mounting apparatus that allows the power supply to be moved must be simple, sturdy and reliable. Once moved to an open position, the power supply must provide adequate access to the motherboard and to the memory. The bracket must also be designed to allow for easy removal and replacement of a defective power supply.

The mounting apparatus for a movable power supply must be designed in a space-conscious manner. The various components of the mounting apparatus should occupy the minimum amount of space that is necessary to house the power supply and to achieve the required movement of the power supply. The mounting apparatus should also be designed to pivot in a manner that keeps the length of the power supply wiring harness to a minimum. By minimizing the length of the harness, space and weight savings will be achieved.

Accordingly, there is a need for an apparatus for pivotally mounting a system component in a computer that overcomes the shortcomings of previous mounting techniques.

SUMMARY

One embodiment, accordingly, provides a system component mounting apparatus that allows the system component to be pivoted between a closed position and an open position to provide access to adjacent components of the computer. To this end, one embodiment provides a computer including a chassis having a plurality of walls and an opening formed in one of the walls. A pair of mounting flanges is connected to the chassis adjacent the opening. A first resilient cantilever beam is provided on each flange. A bracket is mounted in the opening and includes a pair of arms. The bracket is movable between open and closed positions. A second resilient cantilever beam is mounted on each arm and is engaged with each flange.

A principal advantage is that the space within the chassis occupied by the system component is reduced.

BRIEF DESCRIPTION OF THE DRAWING FIGURES

DETAILED DESCRIPTION

Figure 1:
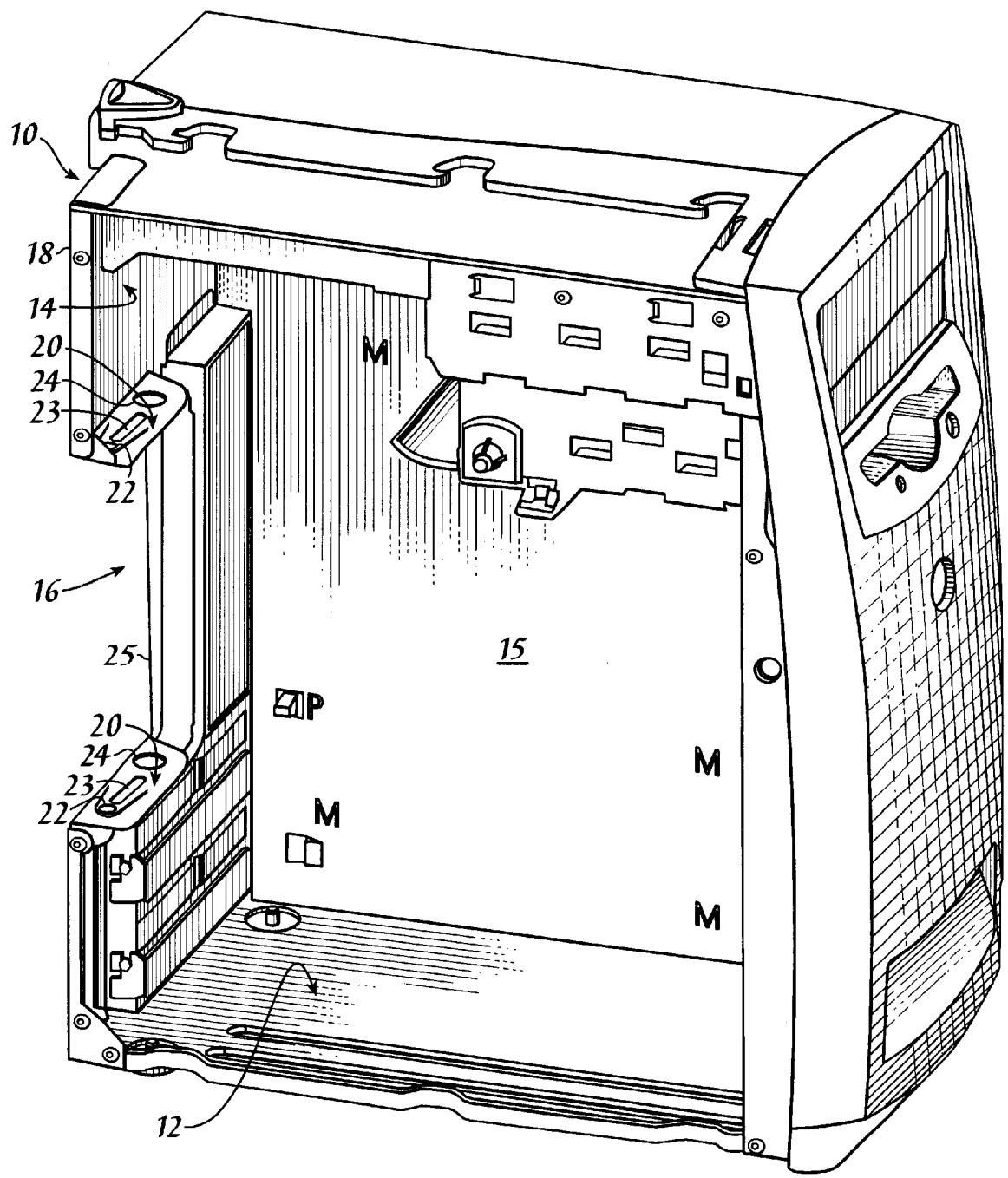
FIG. 1 is a perspective view illustrating an embodiment of a chassis for a computer.

An embodiment of a chassis 10 for a computer system is illustrated in FIG. 1. The chassis 10 includes a base portion 12, a rear wall 14, a side wall 15 and an opening 16 in the rear wall 14. The opening 16 intersects an exterior edge 18 of the chassis 10 such that the rear wall 14 is substantially bisected into an upper portion and a lower portion.

Two mounting flanges 20, FIG. 1, are attached to the chassis 10 adjacent to the opening 16. Each mounting flange 20 includes a positioning member 22 and mounting hole 24. The positioning members 22 include an elongated cantilever beam portion 23. The beam portion 23 permits the positioning member 22 to be resiliently deflected relative to the respective mounting flange 20. The mounting holes 24 are offset from the exterior edge 18. The mounting holes 24 define a pivot axis 25.

Figure 2:
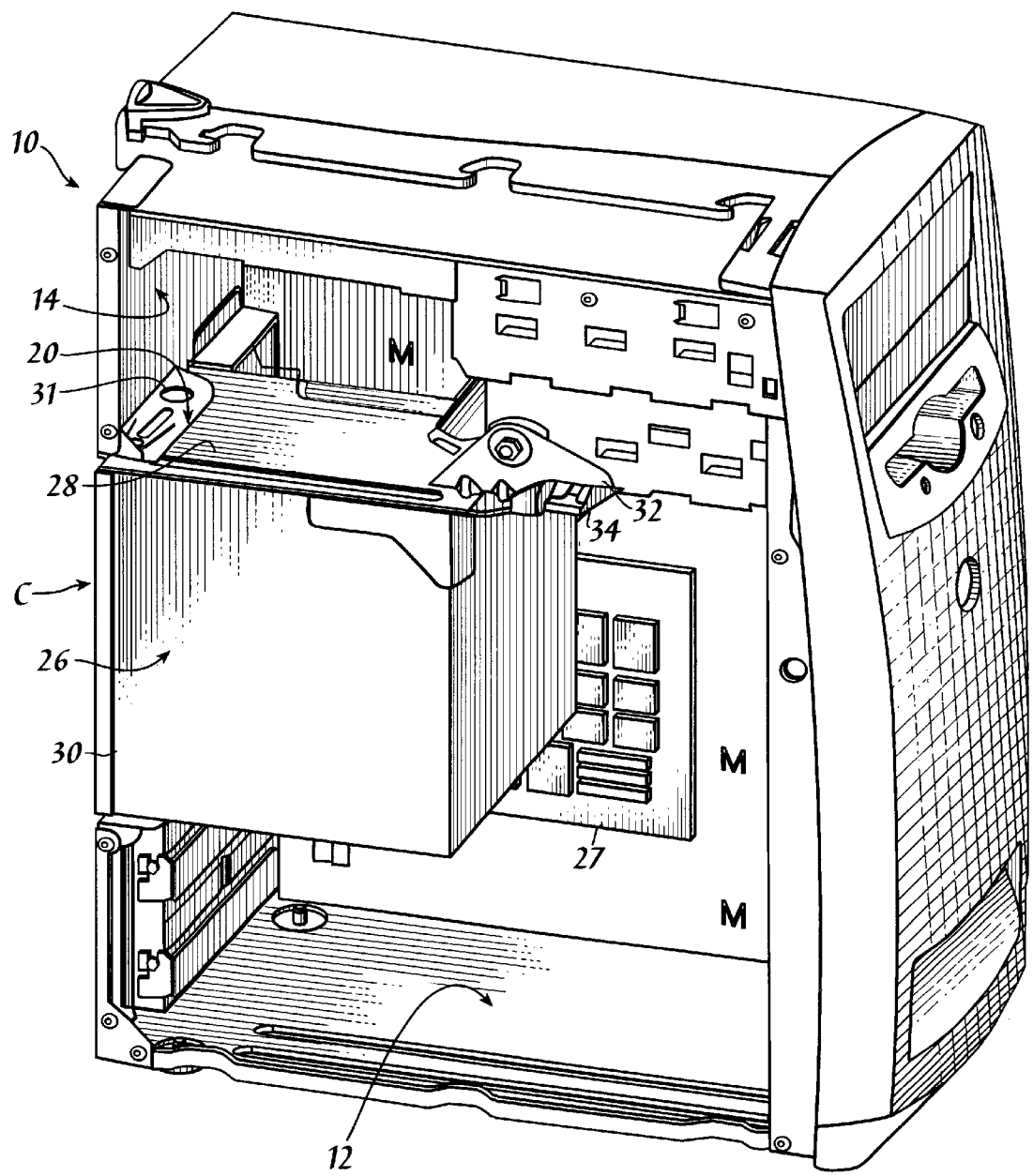
FIG. 2 is a perspective view illustrating an embodiment of a system component assembly mounted to the chassis in a closed position.

A system component assembly 26, FIG. 2, such as a power supply assembly is attached to the chassis 10. The system component assembly 26 includes a bracket 28 and an enclosure 30. The bracket 28 includes pivot members 31 that are pivotally attached to the mounting flanges 20. The enclosure 30 is attached to the bracket 28. The positioning members 22 engage a mating surface of the bracket 28 to provide a static and dynamic friction to aid in positioning the system component assembly 26 in a fixed position relative to the chassis 10.

Figure 3:
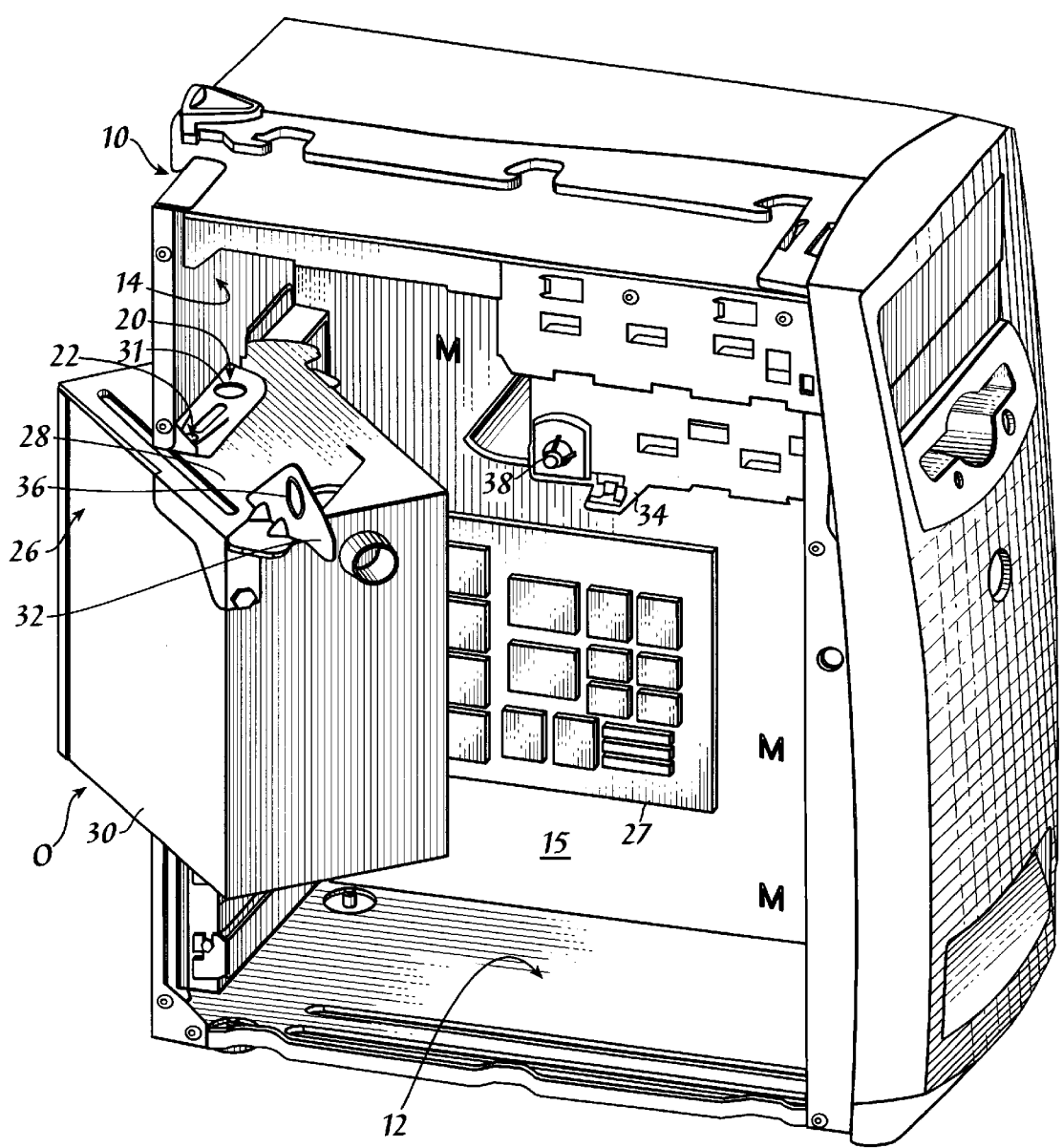
FIG. 3 is a perspective view illustrating an embodiment of the system component assembly in an open position.

The system component assembly 2(3 is movable between a closed position C, FIG. 2, and an open position O, FIG. 3. In the closed position C, other system components of the computer system such as a motherboard 27, FIGS. 2 and 3, may be positioned in the chassis 10 between the side wall 15 and the system components assembly 26. To access the system components positioned between the side wall 15 and the system component assembly 26, the system component assembly 26 may be pivoted from the closed position C to the open position O.

The bracket 28 includes a retaining flange 32, FIGS. 2 and 3. A latch member 34 is attached to the chassis 14. The retaining flange 32 is engaged by the latch member 34 when the system component assembly 26 is in the closed position C. The retaining flange 22 is disengaged from the latch member 34 to allow the system component assembly 26 to be moved from the closed position C to the open position O.

In applications where the system component assembly 26 is relatively heavy, it will be desirable to reinforce the system component assembly 26 relative to the chassis 10. To this end, when the system component assembly 26 is in the closed position C, an aperture 36, FIGS. 2 and 3, in the flange 32 receives a protruding member 38 attached to the chassis 10. The aperture 36 and protruding member 38 are preferably sized to provide a zero clearance or interference fit. In combination with the attachment of the system component assembly 26 to the mounting flanges 20, the engagement of the protruding member 28 in the aperture 36 braces the system component assembly to limit displacement relative to the chassis 10 when in the closed position C.

Figure 4:
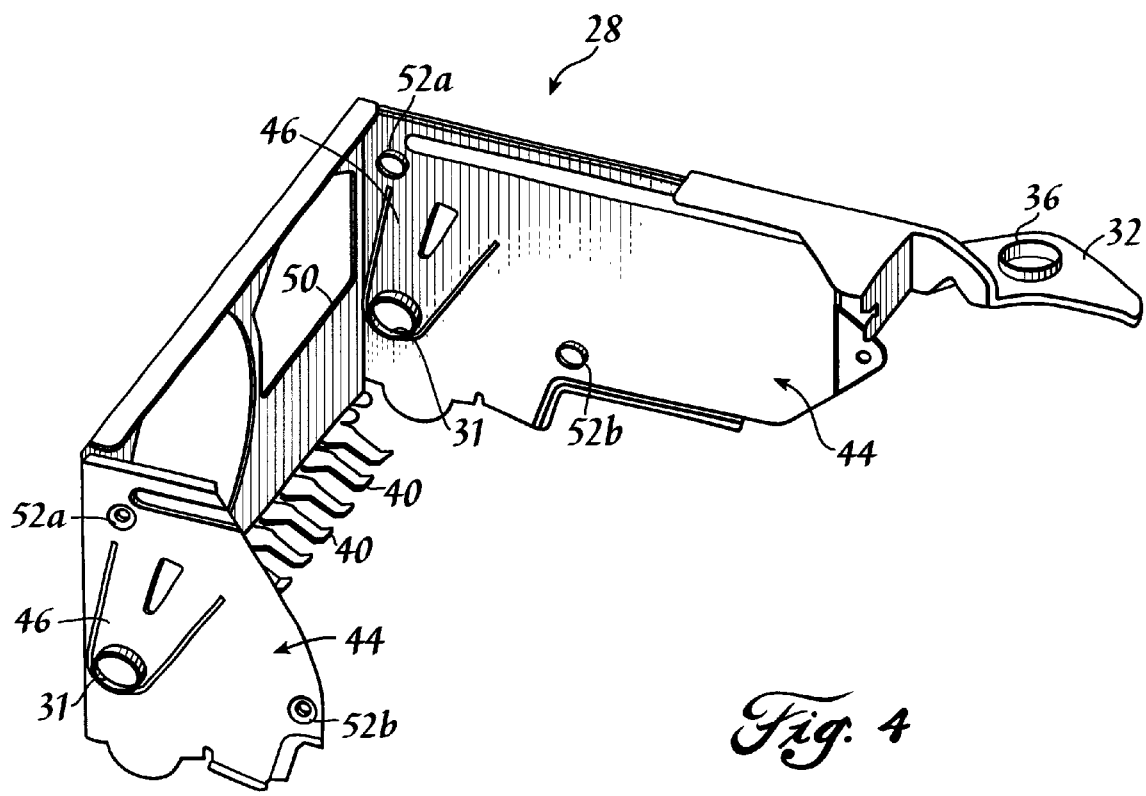
FIG. 4 is a perspective view illustrating an embodiment of a bracket for mounting the system component assembly.

Referring now to FIG. 4, the bracket 28 includes a plurality of contact members 40 resiliently attached to a base wall 42. The contact members 40 engage the chassis 10 when the system component assembly 26 is in the closed position. The engagement of the contact members 40 with the chassis 10 provides a reliable ground connection between the bracket 28 and the chassis 10.

Two arms 44 extend from the base wall 42. Each one of the two arms 44 includes a pivot member 31. Each pivot member 31 is resiliently mounted to the bracket 28 through an elongated cantilever beam 46. The elongated beam 46 allows each pivot member 31 to be deflected such that they can be attached to the corresponding mounting holes 24 in the flanges 20, FIG. 1.

A vent opening 48 and power connection opening 50 are formed in the base wall 42. The vent opening 48 is sized and positioned such that a vent fan of a system component attached to the bracket 28 may exhaust or inlet air through the vent opening 48. Similarly, the power connection opening 50 is sized and positioned to allow a connector of a power cable to be attached to the system component through the bracket 28.

Two detents 52a, 52b are formed in each arm 44. The detents are engaged by the positioning member 22, FIG. 1, to provide for positive positioning of the system component assembly 26. A first detent 52a of each arm 44 is positioned to engage the corresponding positioning member 22 when the system component assembly 26 is in the closed position C. A second detent 52b is positioned to engage the corresponding positioning member 22 when the system component assembly 26 is in the open position O.

In the closed position C, a first portion of the system component assembly 26 substantially fills the opening 16 in the chassis 10, FIG. 2. When the system component assembly is pivoted to the open position O, a second portion of the system component assembly 26 is positioned in the opening 16. It is a key aspect of the present disclosure that a first portion of the system component assembly such as a wall of the enclosure 30 or the base wall 42 of the bracket 28 substantially fill the opening when in the closed position O. It is also a key aspect of the present disclosure that the pivot axis 25, FIG. 1, be positioned such that at least a portion of the system component assembly 26, such as a portion of the bracket 28, resides in opening 16 when it is in the closed position C and in the open position O.

The bracket 28 and attached components such as the positioning members 22 and retaining flange 32 may be formed from sheet metal using commercially available or proprietary stamping and forming techniques. The bracket 28 and attached components may be formed separately or they may be integrally formed. When formed separately, some of the attached components such as the retaining flange 32 may be formed from a polymeric material such as polycarbonate using a process such as injection molding.

Figure 5:
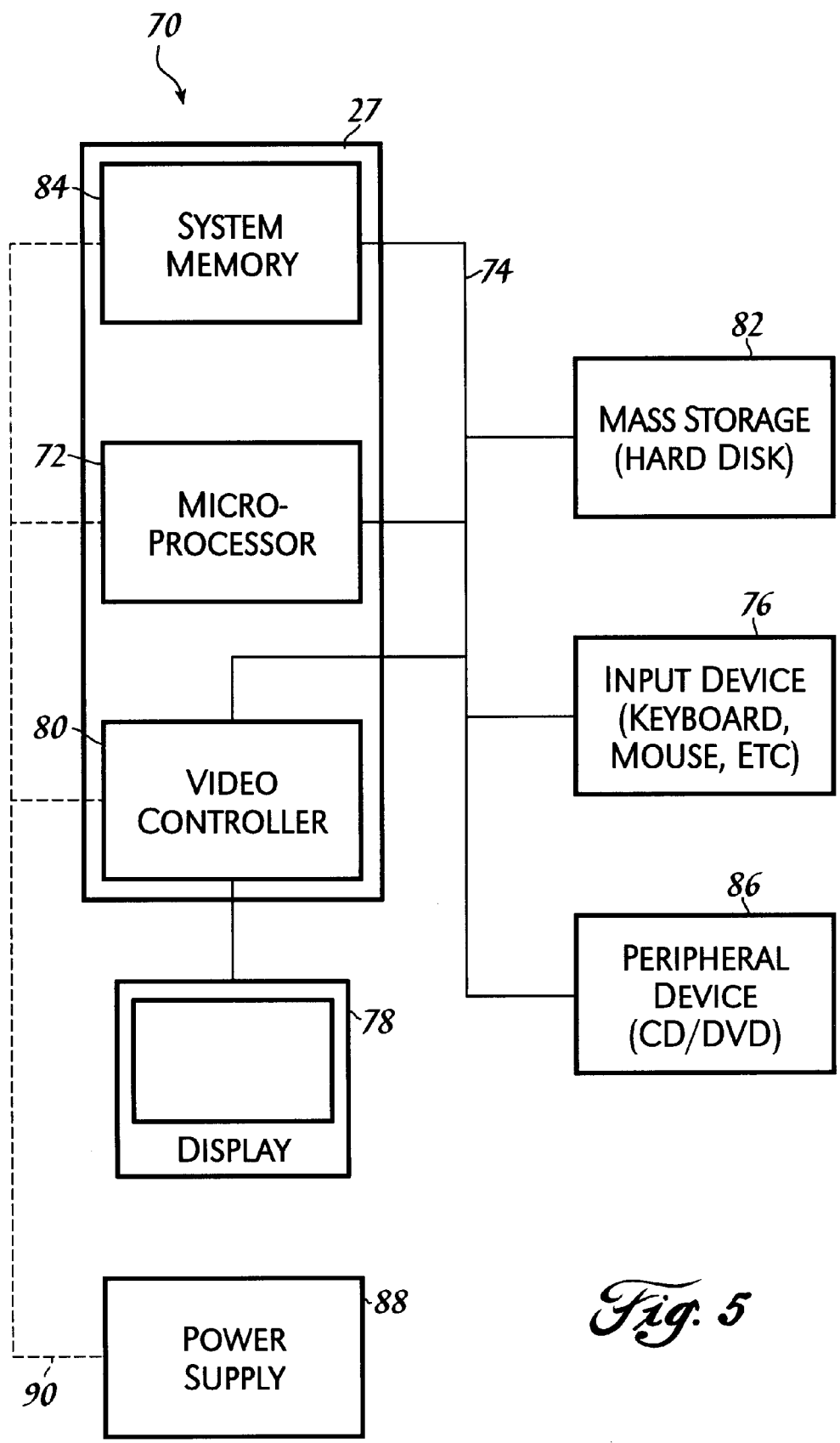
FIG. 5 is a block diagram illustrating an embodiment of a computer system.

An embodiment of a computer system 70 is illustrated in FIG. 5. The computer system 70 includes at least one microprocessor 72. The microprocessor 72 is connected to a signal bus 74. The signal bus 74 serves as a connection between the microprocessor 72 and other components of the computer system 70. One or more input devices 76 may be coupled to the microprocessor 72 to provide input to the microprocessor 72. Examples of input devices include keyboards, touchscreens, and pointing devices such as a mouse, a trackball and a trackpad. The computer system 70 may also include a display 78 which is coupled to the microprocessor 72 typically by a video controller 80. Programs and data are stored on a mass storage device 82 which is coupled to the microprocessor 72. Mass storage devices include components such as hard disks, optical disks, magneto-optical drives, floppy drives, and the like. A system memory 84 provides the microprocessor 72 with fast storage to facilitate execution of computer programs by the microprocessor 72. A peripheral device 86 may be connected to the microprocessor 72 for providing the computer system 70 with additional functionality. Examples of peripheral devices include floppy disk drives, hard disk drives, compact disc players, digital video disc players, memory card readers, and other types of devices. The various components of the computer system are typically mounted in a chassis such as chassis 10, or in an enclosure of a desktop or portable computer. It should be understood that other busses and intermediate circuits can be employed between the components described above and microprocessor 72 to facilitate interconnection between the components and the microprocessor 72.

Still referring to FIG. 5, a power supply 88 is electrically connected through a power supply bus 90 to provide regulated power to at least the microprocessor 72, the system memory 84 and the video controller 80. The microprocessor 72, the system memory 84 and the video controller 80 are typically mounted on a common printed circuit substrate such as a motherboard 27. The power supply may be part of the system component assembly 26 described above.

One embodiment provides a computer chassis having a plurality of walls and an opening formed in one of the walls.

A pair of mounting flanges is connected to the chassis adjacent to the opening. A first resilient cantilever beam is provided on each flange. A bracket is mounted in the opening and includes a pair of arms. The bracket is movable between open and closed positions. A second resilient cantilever beam is mounted on each arm and is engaged with each flange.

Another embodiment provides an apparatus for mounting a system component in a computer chassis having a plurality of walls and an opening formed in one of the walls. A pair of mounting flanges is connected to the chassis adjacent to the opening. A first resilient cantilever beam is provided on each flange. A bracket is mounted in the opening and includes a pair of arms. The bracket is movable between open and closed positions. A second resilient cantilever beam is mounted on each arm and is engaged with each flange. A system component is mounted in the bracket.

Yet another embodiment provides a computer system including a chassis having an opening in an exterior surface. A microprocessor is mounted in the chassis and an input is coupled to the microprocessor to provide input to the microprocessor. Storage is coupled to the microprocessor and memory is coupled to the microprocessor to provide storage to facilitate execution of computer programs by the microprocessor. A pair of mounting flanges is connected to the chassis adjacent the opening. A first resilient cantilever beam is provided on each flange. A bracket is mounted in the opening and includes a pair of arms. The bracket is movable between open and closed positions. A second resilient cantilever beam is mounted on each arm and is engaged with each flange.

As it can be seen, the embodiments presented herein provide several advantages. The space occupied by the power supply mounting apparatus is reduced. The space required for pivoting the power supply to the open position is reduced. The length of the power supply wiring harness is reduced. The power supply may be easily and quickly removed and replaced. The orientation of the pivot axis reduces unassisted movement of the power supply when the power supply is in an open position. The orientation of the pivot axis also allows the power supply to be pivoted without lifting the weight of the power supply.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer chassis, comprising:
 a chassis having a plurality of walls;
 a wall of the chassis having an opening formed therein;
 a pair of mounting flanges connected to the chassis adjacent the opening;
 a first resilient cantilever beam on each flange, the first resilient cantilever beam including a positioning member;
 a bracket mounting in the opening and including a pair of arms, the bracket being movable between an open position and a closed position; and
 a second resilient cantilever beam mounted on each arm and engaged with each flange.

2. The chassis as defined in claim 1 further comprising a latch member.

3. The chassis as defined in claim 1 wherein the bracket includes a plurality of contact members engaged with the chassis in response to the bracket being in the closed position.

4. The chassis as defined in claim 1 wherein each arm includes a pair of spaced apart detents.

5. The chassis as defined in claim 2 wherein the bracket includes a retaining flange extending therefrom for engagement with the latch member.

6. The chassis as defined includes 4 wherein the positioning members engage one of the detents in response to the bracket being in the closed position and engage another of the detents in response to the bracket being in the open position.

7. The chassis as defined in claim 5 wherein the retaining flange includes an aperture formed therein.

8. The chassis as defined in claim 5 wherein the latch member engages the retaining flange in response to the bracket being in the closed position.

9. The chassis as defined in claim 7 wherein the chassis includes a protruding member extending therefrom.

10. The chassis as defined in claim 9 wherein the aperture of the retaining flange engages the protruding member in response to the bracket being in the closed position.

11. The chassis as defined in claim 9 wherein the aperture of the retaining flange engages the protruding member, and the latch member engages the retaining flange in response to the bracket being in the closed position.

12. An apparatus for mounting a system component in a computer chassis comprising:
 a chassis having a plurality of walls;
 a wall of the chassis having an opening formed therein;
 a pair of mounting flanges connected to the chassis adjacent the opening;
 a first resilient cantilever beam on each flange, the first resilient cantilever beam including a positioning member;
 a bracket mounted in the opening and including a pair of arms, the bracket being movable between an opening position and a closed position;
 a second resilient cantilever beam mounted on each arm and engaged with each flange; and
 a system component mounted in the bracket.

13. The chassis as defined in claim 12 further comprising a latch member.

14. The chassis as defined in claim 13 wherein the bracket includes a retaining flange extending therefrom for engagement with the latch member.

15. The chassis as defined in claim 14 wherein the retaining flange includes an aperture formed therein.

16. The chassis as defined in claim 14 wherein the latch member engages the retaining flange in response to the bracket being in the closed position.

17. The chassis as defined in claim 15 wherein the chassis includes a protruding member extending therefrom.

18. The chassis as defined in claim 17 wherein the aperture of the retaining flange engages the protruding member in response to the bracket being in the closed position.

19. The chassis as defined in claim 17 wherein the aperture of the retaining flange engages the protruding member, and the latch member engages the retaining flange in response to the bracket being in the closed position.

20. A computer system comprising:
 a chassis having an opening in an exterior surface thereof;
 a microprocessor mounted in the chassis;

an input coupled to the microprocessor to provide input to the microprocessor;

storage coupled to the microprocessor;

memory coupled to the microprocessor to provide storage to facilitate execution of computer programs by the microprocessor;

a pair of mounting flanges connected to the chassis adjacent the opening;

a first resilient cantilever beam on each flange, the first resilient cantilever beam including a positioning member;

a bracket mounting in the opening and including a pair of arms, the bracket being movable between an open position and a closed position; and a second resilient cantilever beam mounted on each arm and engaged with each flange.

21. The chassis as defined in claim 20 wherein each arm includes a pair of spaced apart detents.

22. The chassis as defined in claim 21 wherein the positioning members engage one of the detents in response to the bracket being in the closed position and engage another of the detents in response to the bracket being in the open position.

* * * * *